No. 676,093. Patented June 11, 1901.
J. DE C. LAFRENIÈRE.
WATER HEATING AND CIRCULATING APPARATUS.
(Application filed Sept. 15, 1900.)
(No Model.) 2 Sheets—Sheet 2.
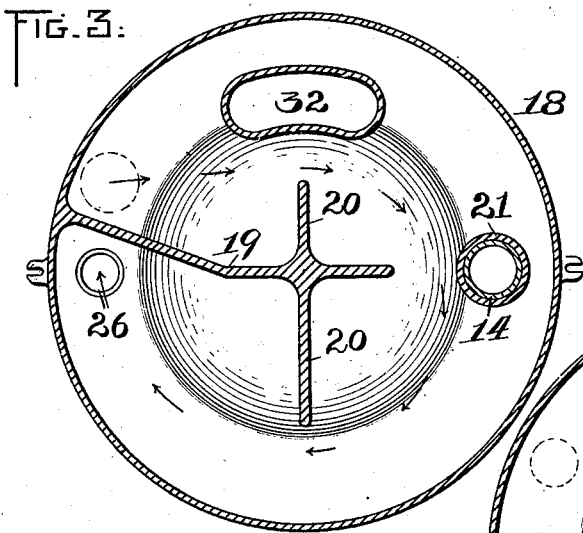
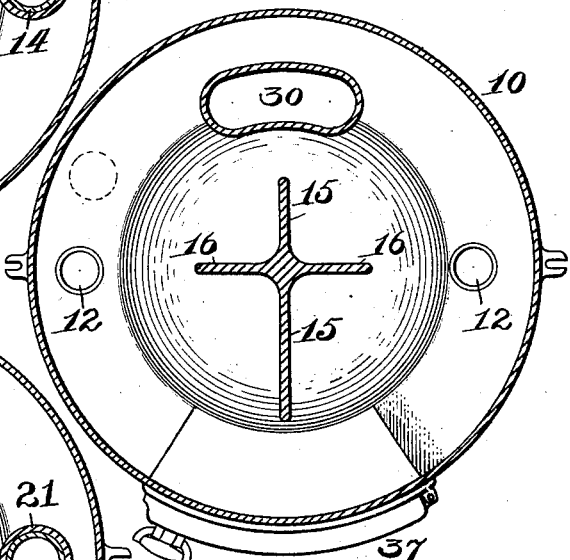
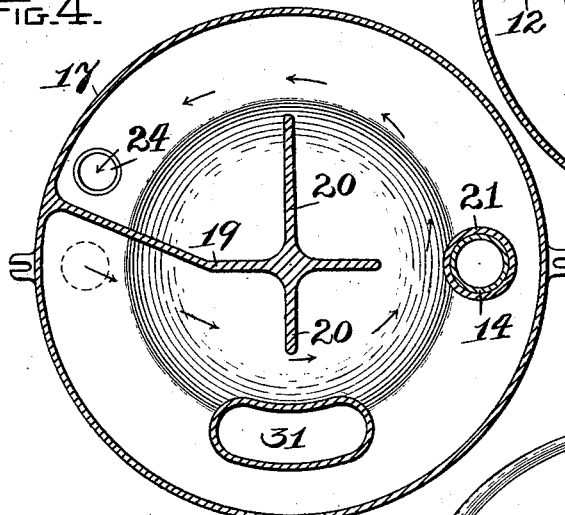
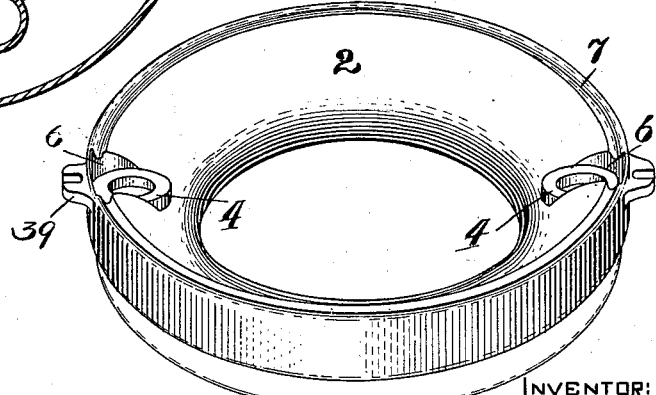

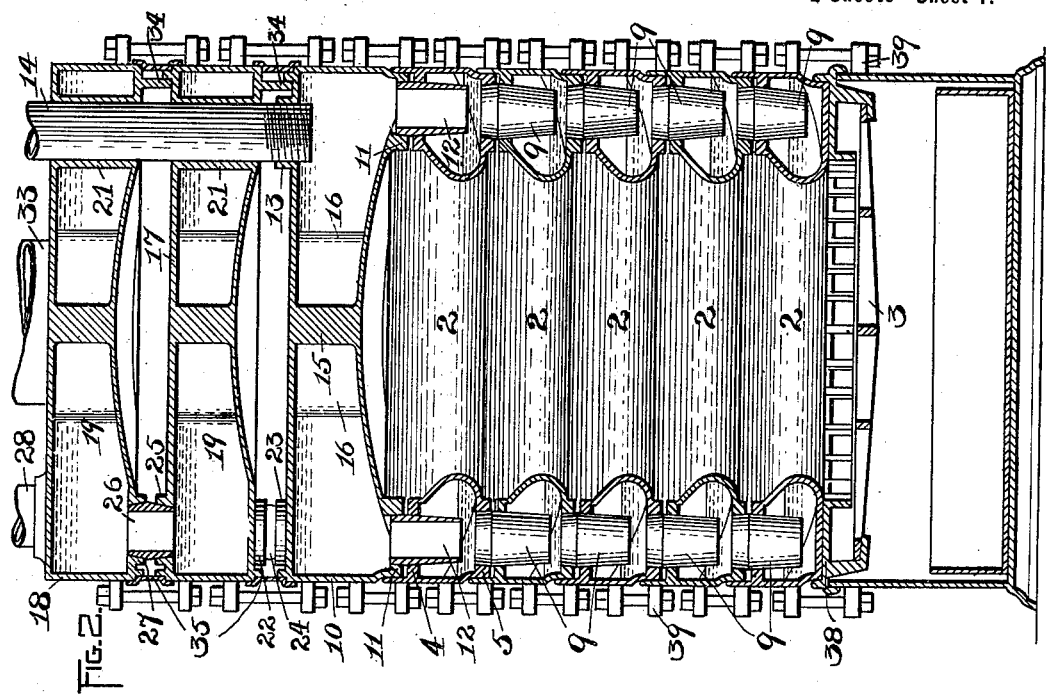

UNITED STATES PATENT OFFICE.

JOSEPH DE C. LAFRENIÈRE, OF BOSTON, MASSACHUSETTS, ASSIGNOR OF ONE-HALF TO PERCIVAL W. ELLIOTT, OF SAME PLACE.

WATER HEATING AND CIRCULATING APPARATUS.

SPECIFICATION forming part of Letters Patent No. 676,093, dated June 11, 1901.

Application filed September 15, 1900. Serial No. 30,107. (No model.)

*To all whom it may concern:*

Be it known that I, JOSEPH DE C. LAFRENIÈRE, of Boston, in the county of Suffolk and State of Massachusetts, have invented certain new and useful Improvements in Water Heating and Circulating Apparatus, of which the following is a description sufficiently full, clear, and exact to enable those skilled in the art to which it appertains or with which it is most nearly connected to make and use the same.

This invention has relation to steam-generating and hot-water heating means generally, and particularly heaters for systems designed for warming dwellings, office buildings, and the like.

It is the chief object of the invention to provide such improvements in steam-generators and hot-water heaters as will secure the utilization or taking up of the maximum units or amount of heat from a furnace or fire-pot with the smallest amount of water that it is practicable to employ, thus accomplishing great economy in the consumption of fuel in the attainment of a given hot-water heating result. This object I attain by the employment of a tier of tubes in communication at opposite sides by means of short pipes or nipples, which depend from the lower sides of the tubes and extend through the tops of subjacent tubes, projecting downwardly to a considerable extent within the interiors thereof, so that the amount of water in the tubes is reduced to the minimum by the trapping of air and steam in the upper parts of the tubes, which results in securing greatly-increased efficiency in transmission of heat through the extensive radiating-surfaces of the tubes.

Another object of the invention is to effectually preheat the return water without disturbing the circulation in the water fire-box, and this is accomplished by providing a superstructure designed to be heated by the products of combustion which would otherwise pass off to the chimney and be wasted, said superstructure having circuitous passage-ways which the return water must traverse before it reaches the tier of tubes, and these passage-ways being separated from that through which the hot water or steam passes out to the heating system, the steam or hot-water outlet being, however, preferably from the lower part of the superstructure, though it may be directly from the uppermost tube of the tier.

The drawings which accompany and form part of this specification illustrate a preferred form of embodiment of the invention, and of said drawings—

Figures 1 and 2 represent the complete structure in cross-section, one view being taken at right angles to the other. Figs. 3, 4, and 5 represent the members of the superstructure in horizontal section. Fig. 6 represents one of the annular tubes of the water fire-box in perspective.

The reference-numeral 2 designates the annular tubes, which are superposed in a tier to form the water fire-box above the grate 3, the said tubes being oblong in cross-section and dished downwardly, so as to expose their water-holding portions to the direct heat of the fire and also present slanting surfaces to prevent accumulation of deposits. These tubes at diametrically opposite points are formed with bosses 4 5 on top and bottom, the tubes being recessed in the top sides, as at 6, to receive the bosses 5 on the bottom of the tube next above, as shown in Fig. 2. Each tube is also formed with a circular groove 7 in its top near the outer side and with a correspondingly-located circular rib 8 on its bottom, the rib of one tube seating in the groove of the subjacent tube, as shown in Fig. 1. The bosses 5 of all the tubes except the lowermost one receive the upper ends of short pipes or nipples 9, which extend through the bosses 4 of the tubes below and depend within the latter to the lower parts thereof. These nipples constitute the only means of communication between the tubes, and it will be seen that by having them depend in this manner within the tubes only the lower portions of the latter will contain water, air and steam being trapped in their upper portions. Extensive heat-radiating surfaces are thus provided for relatively small bodies of water. The water flows down through the nipples at one side and circulates around through the tubes to the opposite side and thence up through the nipples at the latter side.

By reason of the relatively small amount of water used in the tubes 2 and the great radiating area of the said tubes the water therein takes up a large percentage of the units of heat from the fire in the furnace, and hence great economy in the use of fuel is secured, it being well known that in furnaces generally as commonly constructed for heating water a large percentage of the heat escapes through the smoke-flues.

The chief advantage of the invention is therefore that it enables the employment of a relatively small quantity of water in connection with a comparatively great area of heat-radiating surface and that steam generated or water heated for circulation through a heating system is not required, as is frequently the case, to rise through a large body of relatively cool water. Hence the maximum amount of units of heat is utilized from the furnace in heating water and generating steam.

The superstructure for heating the return-water from the system comprises a tier of hollow disks, the lower one, 10, of which is formed with bosses 11 at opposite sides, occupying the recesses 6 in the uppermost tube 2 and receiving nipples 12, which extend through the bosses 4 of said tube and depend within the latter. This disk 10 has a boss 13 on its top at one side receiving the lower end of a pipe 14, which opens into the upper part of the disk above the nipple 12 and constitutes the outtake-conduit for the hot water. A partition 15 is provided within the disk 10 in the form of a web extending from near the front to near the rear, lateral wings 16 being provided for strengthening purposes. This partition serves the purpose of preventing such commingling of the return-water entertering the disk with the heated water flowing therefrom to the pipe 14 as might otherwise be calculated to disturb the circulation. At the same time any water attaining the degree of heat of the upward-moving column is free to join the latter in the disk.

Two hollow disks 17 and 18 are shown surmounting the disk 10, each being of practically the same formation interiorly and exteriorly. In each there is formed a partition or deflector 19, springing from one side and extending obliquely toward the center and thence diametrically across the latter, terminating short of the opposite side of the disk, as clearly shown in Figs. 3 and 4. Wings 20 extend from the front and back of this diametrical portion of the partition, the front wing being somewhat longer than the rear one. Alining sleeves 21 are formed in these upper disks, and the pipe 14 extends through said sleeves to join the piping of the heating system. At the opposite side the middle disk 17 is formed with a boss 22 on the bottom, coming directly over a boss 23 on the disk 10, and a short pipe-section or nipple 24 fits in said bosses and provides communication for return-water between the two disks, said nipple opening into the middle disk in rear of its partition or deflector 19, so that the return-water must reach said nipple behind said partition. A boss 25 is formed on top of said disk 17 to receive a nipple 26 forward of said partition 19, and the top disk 18 has a corresponding boss 27 on its bottom to receive said nipple, which provides communication between the disks 17 and 18 for the return-water. It will be seen that the latter enters the disk 17 in front of the partition and must travel entirely around the interior of the disk to reach the nipple 24, as indicated by the arrows in Fig. 4, wherein the nipple 26 is indicated by dotted lines.

The reference-numeral 28 designates the return-pipe from the heating system, which pipe enters the top of the disk 18 in rear of the partition 19, so that the water must flow entirely around the interior of the disk before it finds an outlet at the nipple 26. The bottoms of the disks are concave and the disks are sufficiently separated to provide heating-chambers 29, through which products of combustion pass to the chimney. The lower disk 10 has a smoke-flue 30 at the rear, leading from the fire-box chamber to the chamber between this disk and the disk 17, and the latter has a smoke-flue 31 at the front leading from said chamber to the chamber between the disks 17 and 18, and the latter has a smoke-flue 32 at the rear leading to the chimney-flue 33. It will be seen that by this arrangement the three disks are thoroughly subjected to the heat of the products of combustion passing upward from the fire-box and that the return water will be effectively heated before reaching the tubes.

The disks 17 and 18 are supported at one side by the connecting nipples and bosses and at the opposite side by legs 34, formed upon the bottoms of these disks and resting on the disks below. The heating-chambers 29 are closed at the sides by flanged bands 35, having clean-out openings with doors, as shown at 36 in Fig. 1.

The uppermost annular tube 2 is formed at the front with an opening which, together with a recess in the bottom of the disk 10, provides a doorway 37 for feeding fuel to the furnace.

The lowermost annular tube rests upon a slightly-dished top plate 38 of the furnace, below which plate the grate is supported.

The tubes and the disks are clamped together by means of lugs 39, formed upon them, and bolts and nuts engaging the lugs, and the lowermost tube is similarly clamped to the fire-pot or base of the furnace.

It will be seen that the construction herein described is well calculated to thoroughly fulfil the objects primarily stated.

The superstructure for heating the return water is not here claimed *per se*, having been made the subject of a divisional application filed November 23, 1900, Serial No. 37,492.

Having thus explained the nature of the invention and described a way of constructing and using the same, though without attempting to set forth all the forms in which it may be made or all the modes of its use, it is declared that what is claimed is—

1. A steam or hot-water heater comprising in its construction a series of water-tubes arranged one above another, the subjacent tubes having one or more communicating passages or pipes, all of which extend from a level intermediate of the top and bottom of the tube, up through the top of the tube and into the bottom of the next higher tube, whereby air or steam in the tubes is trapped in the upper portion of the tube so as to exclude the water from said upper portion, substantially as described.

2. A steam or hot-water heater comprising in its construction a series of annular tubes arranged one above another, each tube being formed with one or more ports in its top which register with a similar port in the bottom of the tube next above, a communicating pipe tightly fitted into each pair of registering ports, the lower end of each pipe terminating at a point intermediate of the top and bottom of the lower tube with which it communicates, whereby the air or steam is trapped in the upper part of the tube above the lower end of the pipe and excludes the water therefrom, substantially as described.

3. A steam or hot-water heater comprising in its construction a series of water-tubes arranged one above another and having communication with each other, the only communication between the adjacent tubes being secured through conduits which lead from a point intermediate of the top and bottom of one tube to the lower part of the next higher tube, substantially as set forth.

4. In a heater of the character described, the combination with the water fire-box composed of a tier of annular tubes in communication at opposite sides through short pipes or nipples depending from the bottom of one tube through the top of the next lower tube and into the interior thereof; of a return-water-heating structure surmounting said fire-box and comprising a number of superposed communicating hollow disks with passage-ways between them for products of combustion, the lower one of which disks communicates at opposite sides with the top part of the water fire-box; an outtake-pipe leading from said lower disk; and a return-water pipe opening into the uppermost hollow disk.

5. In a heater of the character described, the combination with the water fire-box composed of a tier of annular tubes in communication at opposite sides through short pipes or nipples depending from the bottom of one tube through the top of the next lower tube and into the interior thereof; of a return-water-heating structure surmounting said fire-box and comprising a number of superposed hollow disks with passage-ways between them for products of combustion, the lowermost one of which disks communicates at opposite sides with the top part of the fire-box, all of the disks communicating with each other at the same side and the upper ones having deflectors for causing the return-water to traverse their interiors; an outtake-pipe leading from the lowermost disk at one side thereof; and a return-water pipe entering the uppermost disk.

6. In a heater of the character described, the combination with the water fire-box composed of a tier of annular tubes in communication at opposite sides through short pipes or nipples depending from the bottom of one tube through the top of the next lower tube and into the interior thereof; of a return-water-heating structure surmounting said fire-box and comprising a number of superposed communicating hollow disks with passage-ways between them for products of combustion, the lower one of which disks communicates at opposite sides with the top part of the water fire-box; an outtake-pipe leading from said lower disk and extending up through the disks thereabove; and a return-water pipe opening into the uppermost hollow disk.

7. In a heater of the character described, the combination with the water fire-box composed of a tier of annular tubes in communication at opposite sides through short pipes or nipples depending from the bottom of one tube through the top of the next lower tube and into the interior thereof; of a return-water-heating structure surmounting said fire-box and comprising a number of superposed communicating hollow disks with passage-ways between them for the products of combustion, the lower one of which disks communicates at opposite sides with the top part of the water fire-box and has a partition extending partially across its interior between said points of communication with the water fire-box; an outtake-pipe leading from said lower disk and a return-water pipe opening into the uppermost hollow disk.

8. In a heater of the character described, the combination with the water fire-box composed of a tier of annular tubes in communication at opposite sides through short pipes or nipples depending from the bottom of one tube through the top of the next lower tube and into the interior thereof; of a superstructure for heating return-water, the same comprising one or more hollow disks, each with offset inlet and outlet ports and a partition or deflector between them to cause water entering the disk to travel around the same; a lower disk in communication with the outlet from the next disk above, and in communication at opposite sides with the top part of the water fire-box; an outtake-pipe leading from the said lower disk; and a return-water pipe leading into the uppermost disk.

9. In a heater of the character described, the combination with a water fire-box composed of a tier of annular tubes in communication at opposite sides through short pipes or nipples depending from the bottom of one tube through the top of the next lower tube and into the interior thereof; of a superstructure for heating the return-water comprising a number of superposed hollow disks with passage-ways between them for products of combustion, the lowermost one of which is in communication at opposite sides with the uppermost annular tube of the fire-box through short pipes or nipples depending from the bottom of said disk through the top of said tube and into the interior thereof; the upper disks being in communication with each other and with the lowermost disk at one side and having deflectors to cause the return-water to traverse their interiors before passing to the lower disk; an outtake-pipe leading from the latter; and a return-water pipe opening into the uppermost disk.

10. In a heater of the character described, the combination with a water fire-box; of a superstructure with passage-ways for return water; a return-water pipe entering the top part of said superstructure; and a hot-water outtake-pipe leading from the lower part of the superstructure, the latter being in communication with the fire-box.

11. A water-tube for heaters, the same being of annular form oblong in cross-section and downwardly dished so as to present sloping surfaces and provide an inwardly and downwardly projecting water-holding portion, substantially as described.

12. In a heater of the character described a water-tube of annular form having nipples depending within it to the lower part of its interior, said nipples being located at diametrically opposite points and communicating with a water-space above the tube, substantially as described.

13. In a heater of the character described, a horizontal water-tube having a pipe or nipple extending through its top and depending within its interior to a considerable extent, said pipe or nipple communicating with a water-space above and constituting the only means of communication between the tube and such water-space.

In testimony whereof I have signed my name to this specification, in the presence of two subscribing witnesses, this 12th day of September, A. D. 1900.

JOSEPH DE C. LAFRENIÈRE.

Witnesses:
F. P. DAVIS,
A. R. BROWN.